Patented July 15, 1941

2,249,666

UNITED STATES PATENT OFFICE 2,249,666

DELIVERING MECHANISM FOR NEWSPAPERS OR THE LIKE

Harold Herbert Rapley, Bedford, and George Henry Rawlins, Kempston, England

Application November 17, 1939, Serial No. 304,899
In Great Britain October 31, 1938

18 Claims. (Cl. 198—134)

This invention relates to delivery mechanisms for newspapers or the like, and refers more particularly to those mechanisms in which a stream of the papers or the like, in imbricated or overlapping relation, is fed say downwards onto a transversely, say horizontally, moving delivery conveyor fitted with spaced partitions or dividers which successively engage the stream and divide the papers or the like into batches which are carried away, between said dividers, on the delivery conveyor.

One object of the invention is the provision of means whereby the size of the batches carried away by the delivery conveyor can be pre-adjusted.

Another object is the provision of means whereby the accuracy with which the articles are divided into the batches may be increased.

Another object is the provision of means whereby the lifting of the batches from the delivery conveyor is facilitated.

Other objects and advantages will appear hereinafter.

In order that the invention may be the more clearly understood a delivery mechanism in accordance therewith will now be described, reference being made to the accompanying drawing, wherein—

Figure 1:
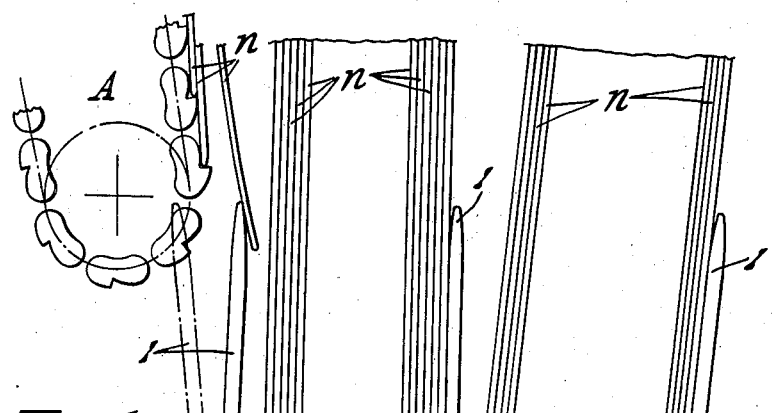
Figure 1 is a side elevation illustrating the feed conveyor for downwardly feeding the stream of papers and the horizontally movable delivery conveyor for dividing the papers into batches and carrying them away, certain of the repeated parts of the delivery conveyor being shown only once for the sake of clearness.

Referring to the drawing a stream of the newspapers $n$, in imbricated or overlapping relation, is fed vertically downwards by means of a feed conveyor A, onto a horizontally moving delivery conveyor B which carries upstanding partitions or dividers $1$ which successively engage the stream of newspapers $n$ and divide it so that batches of the newspapers on edge are carried away on the delivery conveyor B between the dividers. It will be seen that, as the newspapers in the feed conveyor A are fed at constant speed and overlap one another at equal intervals, and, as the delivery conveyor B also moves at a constant speed and has the dividers $1$ spaced at equal intervals therealong, the batches will contain the same number of newspapers, which number may be predetermined by varying the relation between the speed of the delivery conveyor B and the rate of feeding of the newspapers by the feed conveyor A.

The delivery conveyor B comprises an endless chain, and the upstanding dividers $1$ are mounted on the links $2$ of said chain so as to be pivotable about horizontal transverse axes $3$. Cam means, which will be hereinafter described, are provided whereby each divider $1$, as it approaches the downwardly moving stream of papers $n$ in the feed conveyor A, is first tilted backwardly beyond the vertical as shown in chain dotted lines in Figure 1, and is then suddenly tilted forwardly beyond the vertical to the position occupied by the rearmost divider in Figure 1, after which it is returned substantially to the vertical as in the case of the middle divider of Figure 1. The engagement of said divider $1$ with the stream is effected during the sudden forward tilting thereof, whilst its upper extremity, which actually engages the papers $n$, is moving rapidly. This ensures that engagement will always be made between the correct pair of adjacent papers $n$, which would not be so certain if the said upper extremity were moving slowly at the moment of contact. The fact that the divider $1$, upon engagement with the stream, first tilts forwardly beyond the vertical before returning substantially to the vertical, ensures the engaged paper being more satisfactorily separated from its neighbor.

Finally, when each divider $1$ reaches the point at which the batch immediately behind it is to be lifted from the delivery conveyor, said divider again tilts forwardly to the position occupied by the foremost divider of Figure 1. This causes the said batch immediately behind said divider, and which is supported thereby, to tilt forwardly, thereby separating its upper end from the succeeding batch as clearly shown in Figure 1 and enabling it to be more easily lifted out.

For effecting the above described tilting operations of the dividers $1$, each divider is biased by means of a spring $4$ relative to its supporting link $2$, about its pivotal axis $3$, in a forward direction to a limiting position, and, as said divider approaches the downwardly moving stream of papers $n$, a rocking arm $5$, in rigid relation to said divider, and which extends rearwardly and upwardly from the pivotal axis $3$ thereof, engages the underside of a generally horizontal cam bar $6$. This forces the rocking arm $5$ downwardly and effects the aforesaid initial rearward tilting of the divider. At the appropriate point, the rocking arm $5$ reaches a recess $7$ in the cam bar 6 which it enters suddenly under the influence of the biasing spring 4, whereby the aforesaid sudden forward movement of the divider 1 takes place. Just afterwards, the rocking arm 5 rides out of the recess 7, and throughout the remaining extent of the cam bar 6 the underside thereof is level and at such a height that the divider remains substantially vertical as aforestated. When the rocking arm 5 leaves the cam bar 6, the divider 1 springs forwardly to its limiting position, thereby, as aforesaid tilting forwardly the batch just behind it and enabling the same to be the more easily lifted out. The divider 1 remains at this position relative to its link for the remainder of its journey until its rocking arm 5 again reaches the cam bar 6.

In construction, each divider 1 is rigidly mounted on a rocking unit which is pivotally mounted about the axis 3 on a fixed unit 8 rigidly secured to the chain link 2. This rocking unit, as well as comprising the aforesaid rocking arm 5, comprises a biasing arm 9 between which and a suitable part of the fixed unit 8 is the compression spring 4 for biasing the divider forwardly to the said limiting position, and a stop arm 10 which engages a suitable part of said fixed unit 8 for establishing said limiting position. As shown said stop arm 10 carries an adjustable screw 11 which enables said limiting position to be adjusted.

Figure 2:
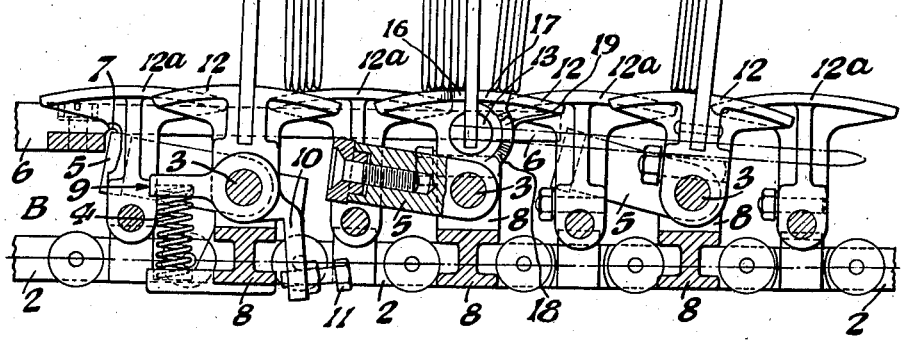
Figure 2 is a plan of said horizontally movable delivery conveyor, shown somewhat diagrammatically.

At its upper end, where the divider 1 is mounted, said rocking unit is formed with a platform portion 12, which, together with the platform portions of the other units, constitutes the conveyor surface on which the edges of the papers $n$ rest. In the present arrangement every second link 2 carries a rocking unit and divider 1, and the intervening links carry platform portions 12a—which may be in rigid relation therewith—similar to the platform portions 12 comprised in the rocking units. The platform portions 12 of the rocking units may form one half of the conveyor surface being in staggered overlapping relation with the platform portions 12a of the intervening links which form the other half of said conveyor surface as best shown in Figure 2.

In the present arrangement every second divider 1 is capable of being moved by hand, relative to their rocking units, to a horizontal non-operative position as shown in chain dotted lines in Figure 1. When these movable dividers are at the non-operative position, the conveyor B is adapted to handle batches or quires of say twenty-six or twenty-seven thick papers $n$, whereas, when said movable dividers are at the operative position, the conveyor is adapted to handle batches or quires of twenty-six or twenty-seven thin papers $n$. Of course the relative speeds of the delivery conveyor B and the feed conveyor A would have to be suitably adjusted so that the operative dividers divide off the correct number of sheets $n$ in each case, but if the quires of thin sheets were divided by the same dividers which divide the quires of thick sheets, the former would be inconveniently loose between these adjacent dividers.

These movable dividers are rigidly mounted on a shaft 13 which is rotatably mounted in the rocking unit parallel to, and at a level above, the axis of rotation 3 of said rocking unit. This shaft projects beyond the outer side of the platform portion 12 of said rocking unit, and the divider 1 is mounted on the projecting portion of the shaft so that when at its down or inoperative position it lies snugly at the side of the conveyor. The shaft just under the divider is formed with an enlarged milled head 14 whereby the divider may be turned by hand to and from its two positions. For retaining said divider at its upright and at its horizontal position, the shaft 13 is biased by means of a spring 15 in an axial direction relative to the rocking unit in such a way that the divider is pressed against the outer side of said rocking unit, and the latter is formed with slots into which the divider engages, under the influence of such bias, when at the upright and at the horizontal positions respectively. Thus the edge of the platform portion 12 of the rocking unit is formed with projections 16 and 17 between which is formed the slot for retaining the divider in the upright position and said rocking unit is also formed with like projections 18 and 19 between which is formed the slot for retaining said divider in the horizontal position. To move the divider from one position to the other the milled head 14 is pulled outwardly in opposition to the spring 15 until the divider disengages the one slot, and is then turned until said divider registers with the other slot, which slot said divider is allowed to enter under the influence of said spring 15.

The feed conveyor may suitably be in accordance with application S. No. 249,685 filed January 7, 1939.

It will be appreciated that, if desired, all of the dividers 1, or any other desired proportion of them, may be adjustable to and from an operative and a non-operative position.

It will be appreciated that in practice the arrangement would usually be such that the dividers 1 remain in the vertical position for a considerably longer interval than is shown in Figure 1—say the space of three or four dividers.

What we claim and desire to secure by Letters Patent is:

1. Delivery mechanism for articles such as newspapers, comprising means for feeding a stream of the articles, in imbricated relation, a delivery conveyor moving transversely to the direction of movement of said articles, a plurality of upstanding dividers carried thereby and spaced in relation to each other for receiving a predetermined number of such articles and adapted successively to engage the stream and divide the articles into batches to be carried away, between said dividers, on said delivery conveyor, and means whereby certain of said partitions or dividers can be adjusted to and from an operative and a non-operative position, whereby the space between succeeding dividers may be predetermined and the number or thickness of articles in said batches may be varied.

2. Delivery mechanism for articles such as newspapers, comprising means for feeding a stream of the articles, in imbricated relation, a delivery conveyor moving transversely to the direction of movement of said articles, a plurality of upstanding dividers carried thereby and spaced in relation to each other for receiving a predetermined number of such articles and adapted successively to engage the stream and divide the articles into batches to be carried away, between said dividers, on said delivery conveyor, alternate partitions or dividers being pivotally mounted upon said conveyor so that they can be rotated to and from an operative and a non-operative position, means whereby said pivotally mounted partitions or dividers may be held in either the operative or the non-operative position and the space between succeeding dividers may be predetermined so that the number or thickness of articles in said batches may be varied.

3. Delivery mechanism for articles such as newspapers, comprising means for feeding a stream of the articles, in imbricated relation, a delivery conveyor moving transversely to the direction of movement of said articles, a plurality of upstanding dividers carried thereby and spaced in relation to each other for receiving a predetermined number of such articles and adapted successively to engage the stream and divide the articles into batches to be carried away, between said dividers, on said delivery conveyor, alternate partitions or dividers being pivotally mounted upon said conveyor so that they can be rotated to and from an operative position at which they stand up and a non-operative position at which they lie to one side of the conveyor surface, and means whereby said pivotally mounted partitions or dividers may be held in either the operative or the non-operative position and the space between succeeding dividers may be predetermined so that the number or thickness of articles in said batches may be varied.

4. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, certain of said partitions or dividers being pivotally mounted on said conveyor about horizontal axes transverse to the line of movement of said conveyor and being off set to one side of said conveyor so that they can be rotated to and from an operative position at which they stand up and a non-operative position at which they lie to one side of the conveyor surface.

5. Delivery mechanism for articles such as newspapers, comprising means for feeding a stream of the articles, in imbricated relation, a delivery conveyor moving transversely to the direction of movement of said articles, a plurality of upstanding dividers carried thereby and spaced in relation to each other for receiving a predetermined number of such articles and adapted successively to engage the stream and divide the articles into batches to be carried away, between said dividers, on said delivery conveyor, means whereby alternate partitions or dividers can be adjusted to and from an operative and a non-operative position, and releasable means for retaining said adjustable partitions or dividers in either the operative or the non-operative position, whereby the space between succeeding dividers may be predetermined so that the number or thickness of articles in said batches may be varied.

6. Delivery mechanism for articles such as newspapers, comprising means for feeding a stream of the articles, in imbricated relation, a delivery conveyor moving transversely to the direction of movement of said articles, a plurality of upstanding dividers carried thereby and spaced in relation to each other for receiving a predetermined number of such articles and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, and means independent of said delivery conveyor whereby each of said partitions or dividers is first rocked rearwardly as it approaches the point of engagement with the stream, is rocked forwardly so that it engages the last article in a batch of articles in said stream during such forward rocking and is again rocked rearwardly to the normal position whereby the tops of succeeding batches are separated one from the other.

7. Delivery mechanism for articles such as newspapers, comprising means for feeding a stream of the articles, in imbricated relation, a delivery conveyor moving transversely to the direction of movement of said articles, a plurality of upstanding dividers carried thereby and spaced in relation to each other for receiving a predetermined number of such articles and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, and means whereby said partitions or dividers are automatically rocked about said axis to a position forwardly of the normal position, each before it reaches the position at which the batch of articles immediately behind it is to be lifted from said delivery conveyor, whereby the tops of succeeding batches are spaced apart to facilitate the lifting of succeeding batches from the delivery conveyor.

8. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, and cam means whereby said partitions or dividers are each automatically rocked about said axis in a forward direction at the moment at which they engage the stream of articles.

9. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, and cam means whereby said partitions or dividers are automatically rocked about said axis to a position forwardly of the normal position, each before it reaches the position at which the batch of articles immediately behind it is to be lifted from said delivery conveyor.

10. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles in batches to be carried away, between said dividers, on said delivery conveyor, said partitions or dividers being mounted on said conveyor each by means of a pivotal mounting having its axis transverse of the line of movement of said conveyor, means for biasing each partition or divider in one direction about its rocking axis, a cam bar which is in general parallel to the direction of movement of said delivery conveyor and a cam part associated with each partition or divider and adapted by virtue of the bias to engage said cam bar, the cam surfaces being such that said partitions or dividers are each automatically rocked in a forward direction at the moment at which they engage the stream of articles.

11. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, means for biasing each partition or divider in one direction about is rocking axis, a cam bar which is in general parallel to the direction of movement of said delivery conveyor and a cam part associated with each partition or divider and adapted by virtue of the bias to engage said cam bar, the cam surfaces being such that each of said partitions or dividers is first rocked rearwardly prior to its engagement with the stream and is next rocked forwardly so it engages said stream during such forward rocking.

12. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, means for biasing each partition or divider in one direction about its rocking axis, a cam bar which is in general parallel to the direction of movement of said delivery conveyor and a cam part associated with each partition or divider and adapted by virtue of the bias to engage said cam bar, the cam surfaces being such that said partitions or dividers are automatically rocked to a position forwardly of the normal position, each before it reaches the position at which the batch of articles immediately behind it is to be lifted from said delivery conveyor.

13. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, means for biasing each partition or divider in one direction about its rocking axis, a cam bar which is in general parallel to the direction of movement of said delivery conveyor and a cam part associated with each partition or divider and adapted by virtue of the bias to engage said cam bar, the cam surfaces being such that each of said partitions or dividers is first rocked rearwardly from the normal position prior to its engagement with the stream, is next rocked forwardly beyond its normal position so that it engages said stream during such forward rocking, is next rocked rearwardly to said normal position, and finally, just before it reaches the position at which the batch of articles immediately behind it is to be lifted from said delivery conveyor, is again rocked to a position forwardly of the normal position.

14. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, and cam means whereby each of said partitions or dividers is first rocked rearwardly from the normal position prior to its engagement with the stream, is next rocked forwardly beyond its normal position so that it engages said stream during such forward rocking, is next rocked rearwardly to said normal position, and finally, just before it reaches the position at which the batch of articles immediately behind it is to be lifted from said delivery conveyor, is again rocked to a position forwardly of the normal position.

15. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, cam means whereby said partitions or dividers are each automatically rocked about said axis in a forward direction at the moment at which they engage the stream of articles, certain of said partitions or dividers being mounted each on its aforesaid pivotal mounting by means of a second pivotal mounting having its axis transverse of the line of movement of said conveyor so that such partitions or dividers can be adjusted at will about their second axes to and from an operative and a non-operative position, whereby the size of said batches may be varied.

16. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, cam means whereby said partitions or dividers are automatically rocked about said axis to a position forwardly of the normal position, each before it reaches the position at which the batch of articles immediately behind it is to be lifted from said delivery conveyor, certain of said partitions or dividers being mounted each on its aforesaid pivotal mounting by means of a second pivotal mounting having its axis transverse of the line of movement of said conveyor so that such partitions or dividers can be adjusted at will about their second axes to and from an operative and a non-operative position, whereby the size of said batches may be varied.

17. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, means whereby said partitions or dividers are each automatically rocked about said axis in a forward direction at the moment at which they engage the stream of articles, and platform portions associated with the respective partitions or dividers so as to rock as one piece therewith, said platform portions forming the conveyor surface.

18. Delivery mechanism for articles such as newspapers, comprising means for feeding a stream of the articles, in imbricated relation, a delivery conveyor moving transversely to the direction of movement of said articles for receiving such articles, spaced partitions or dividers mounted on said delivery conveyor and adapted successively to engage the stream and divide the articles into batches to be carried away, between said dividers, on said delivery conveyor, said partitions or dividers being mounted on said conveyor each by means of a pivotal mounting having its axis transverse of the line of movement of said conveyor, means whereby said partitions or dividers are automatically rocked about said axis to a position forwardly of the normal position, each before it reaches the position at which the batch of articles immediately behind it is to be lifted from said delivery conveyor and platform portions associated with the respective partitions or dividers so as to rock as one piece therewith, said platform portions forming the conveyor surface.

HAROLD HERBERT RAPLEY.
GEORGE HENRY RAWLINS.